Jan. 6, 1948.　　R. R. BIRCHFIELD　　2,434,063
MASTER CYLINDER FOR HYDRAULIC BRAKES
Filed July 13, 1945
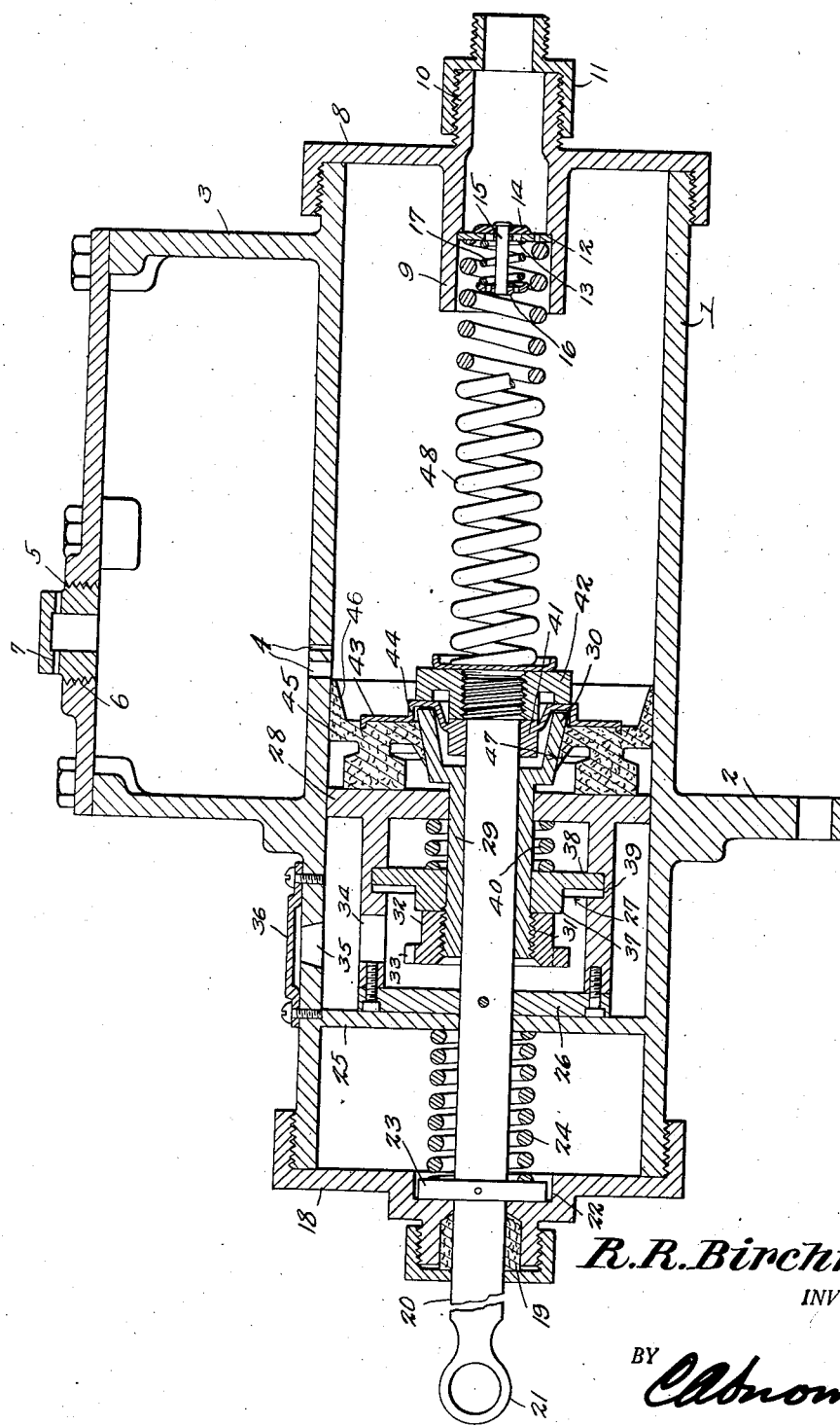
R.R.Birchfield
INVENTOR.
BY
ATTORNEYS.

Patented Jan. 6, 1948

2,434,063

UNITED STATES PATENT OFFICE 2,434,063

MASTER CYLINDER FOR HYDRAULIC BRAKES

Roy R. Birchfield, Shreveport, La.

Application July 13, 1945, Serial No. 604,738

2 Claims. (Cl. 309—34)

This invention relates to master cylinders for use in connection with hydraulic brake systems, an object being to provide a master cylinder having a piston which is so constructed and operated that it will not permit the brake fluid from seeping from the secondary cylinders usually employed for controlling the respective brake shoes.

A further object is to provide a master cylinder the piston of which can be easily adjusted for the purpose of compensating for wear.

With the foregoing and other objects in view which will appear as the description proceeds, the invention consists of certain novel details of construction and combination of parts hereinafter more fully described and pointed out in the claims, it being understood that changes may be made in the construction and arrangement of parts without departing from the spirit of the invention as claimed.

In the accompanying drawing which is a central longitudinal section through the master cylinder, the preferred form of the invention has been shown.

Referring to the drawing by characters of reference 1 designates a cylinder or casing having an attaching flange 2 or the like and also provided with a reservoir 3 in constant communication with the cylinder through one or more ports 4, this reservoir having a closure 5 for its inlet opening 6 and said closure being preferably formed with one or more vents 7.

At the outlet end of the cylinder there is provided a removable head 8 having coaxial tubular extensions 9 and 10 projecting in opposite directions from the center thereof and the extension 10 can be provided with a coupling 11 whereby the cylinder can be joined to one of the pipes (not shown) of the brake system.

Positioned within the other extension 9 is a disc 12 having an opening 13. This disc provides a seat for a disc valve 14 the stem 15 of which is provided with an apertured disc-like head 16 constituting a seat for one end of a light coiled spring 17, the other end of which bears against the partition disc 12 so that said spring thus serves normally to hold valve 14 against its seat.

Another head 18 is detachably mounted on the other end of cylinder 1 and is suitably packed as at 19 to prevent leakage along a piston rod 20 which is slidably mounted in the head and is adapted to be joined at its outer end 21 by any suitable means (not shown) to a brake pedal. The inner side of the head 18 is recessed at 22 to provide a seat for a collar 23 secured to the piston. This collar is held normally to its seat by a coiled spring 24 mounted on the piston rod and exerting a constant thrust against a partition 25 formed in the cylinder at a point between its ends.

Secured to the piston rod 20 is a disc 26 held normally pressed against partition 25 by spring 24. This disc is provided with connecting means 27 whereby it is joined to a piston head 28 having a snug working fit upon the inner surface of the cylinder 1.

Slidably mounted on piston rod 20 and within the piston head 28 is a sleeve 29 one end of which has a hollow frusto-conical spreader 30 while the other end, which is located between disc 26 and head 28, is screw threaded as at 31 for engagement by an adjusting nut 32. This nut has a series of teeth 33 exposed through an opening 34 in the connection 27, said opening, in turn, being located inwardly from another opening 35 in cylinder 1 and normally closed by a removable cover plate 36. By removing this cover plate a screw driver or the like can be inserted into the two openings and placed in engagement with teeth 33, thereby serving as a means for rotating the nut to advance or retract it on the threaded portion of the sleeve 29.

A collar 37 is slidably mounted on the sleeve and engaged by nut 32. This collar is provided with an annular flange 38 extending into an annular groove 39 formed in the connection 27. A spring 40 is mounted on sleeve 29 between collar 37 and head 28 and serves to hold the collar 37 normally pressed against nut 32. Obviously by turning the nut in one direction the collar will be adjusted within the limits of groove 39 against the action of spring 40 but when the nut is turned in the other direction the spring 40 will cause the collar 37 to recede therewith.

Mounted on rod 20 and within the spreader 30 is a bushing 41 which is adapted to be adjusted along the rod by means of a nut 42. This bushing is provided with an integral cover plate 43 having an annular recess 44 so located as to straddle the edge of the spreader. The cover plate exerts a thrust against a packing disc 45 formed of any desired number of layers of rubber or other suitable soft packing material extending close to the wall of the cylinder 1 and provided with an annular flange 46 adapted to hug said wall when expanded by liquid trapped within cylinder 1. This packing disc 45 has a central opening 47 in which the spreader 30 is seated and obviously by adjusting the spreader in one direction with sleeve 29, it will act to expand packing 45 so as thereby to compensate for wear on the packing.

A coiled spring 48 is interposed between the partition disc or seat 12 and the nut 42 and serves to hold the packing disc of the piston normally pressed against the head 28.

It will be obvious that when the piston rod 20 is thrust forwardly by the actuation of the brake pedal the piston formed of the packing disc 45, cover plate 43, head 28 and associated parts will be forced toward the outflow end of the master cylinder, thereby compressing spring 48 and forcing the trapped fluid to unseat valve 14 so that it can flow into the balance of the brake system as ordinarily. When the piston is actuated its packing disc is automatically maintained in tight engagement with the cylinder 1 so that there can be no leakage.

What is claimed is:

1. The combination with a piston rod and a cylinder, of a piston carried by the rod and slidably mounted relative to the cylinder, a sleeve on the rod slidably engaged by the piston, spring restrained means in the piston for limiting the movement of the piston in one direction relative to the sleeve, adjustable means on the sleeve and within the piston for limiting the relative movement of the piston and the sleeve in the opposite direction, packing carried by the rod and having a working fit against the cylinder and one end of the piston, and means carried by the sleeve and shiftable thereby for expanding the packing relative to the cylinder.

2. The combination with a rod, of a hollow piston, a closure for one end of the piston connected to the rod, a sleeve interposed between the rod and the piston and projecting beyond one end of the piston, a collar in the piston slidably mounted on the sleeve, an annular flange on the collar projecting into and proportioned for limited sliding movement longitudinally of the piston, a coiled spring interposed between the collar and one end of the piston, means in the piston and adjustably mounted on the sleeve for limiting the relative movement of the piston and collar in one direction, packing carried by the rod and having a working fit against the cylinder and one end of the piston, and packing expanding means carried by and shiftable with the sleeve during the relative movement of the piston and sleeve.

ROY R. BIRCHFIELD.

REFERENCES CITED

The following references are of record in the file of this patent:

UNITED STATES PATENTS

| Number | Name | Date |
| --- | --- | --- |
| 116,336 | McAlonan | June 27, 1871 |
| 1,773,402 | Miller | Aug. 19, 1930 |
| 1,943,679 | LeCour | Jan. 16, 1934 |
| 1,945,152 | Marsh | Jan. 30, 1934 |
| 2,003,247 | Carroll | May 28, 1935 |
| 2,166,724 | Loweke | July 18, 1939 |
| 2,242,542 | Peterson | May 20, 1941 |